(12) United States Patent
Nagatoshi

(10) Patent No.: US 7,663,806 B2
(45) Date of Patent: Feb. 16, 2010

(54) PROJECTION LENS AND PROJECTION TYPE DISPLAY DEVICE USING THE SAME

(75) Inventor: Yukiko Nagatoshi, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/243,707

(22) Filed: Oct. 1, 2008

(65) Prior Publication Data

US 2009/0109543 A1 Apr. 30, 2009

(30) Foreign Application Priority Data

Oct. 25, 2007 (JP) ............... P2007-277606

(51) Int. Cl.
*G02B 13/00* (2006.01)
*G02B 3/00* (2006.01)
(52) U.S. Cl. .................. 359/649; 359/651
(58) Field of Classification Search ......... 359/649–651, 359/754
See application file for complete search history.

(56) References Cited

U.S. PATENT DOCUMENTS

| 6,624,952 B2 | 9/2003 | Kuwa et al. |
| 6,947,222 B2 | 9/2005 | Komatsu et al. |
| 7,173,777 B1 * | 2/2007 | Lu et al. ............... 359/784 |
| 7,342,723 B2 * | 3/2008 | Rodriguez et al. ......... 359/649 |

FOREIGN PATENT DOCUMENTS

| JP | 2003-15033 A | 1/2003 |
| JP | 2004-326079 A | 11/2004 |
| JP | 2007-147970 | 6/2007 |
| JP | 2007-157248 A | 6/2007 |

* cited by examiner

*Primary Examiner*—Scott J Sugarman
(74) *Attorney, Agent, or Firm*—Birch, Stewart, Kolasch & Birch, LLP

(57) ABSTRACT

A projection lens includes, in order form a magnification side: a first lens group having negative refractive power; and a second lens group having positive refractive power. An aspheric lens is arranged on the most magnification side of the first lens group. The conditional expressions $3<Bf/f$ and $0.4<H/L$ are satisfied, where f denotes a focal length of the projection lens, Bf denotes an air-converted back focal length, H denotes a height of a principal ray at the maximum angle of view on a plane which is orthogonal to an optical axis and which passes through point A, and L denotes a length from the point A to a vertex of a lens surface on the most reduction side on the optical axis. Here, the point A is a vertex of a lens surface on the most magnification side on the optical axis.

10 Claims, 10 Drawing Sheets

EXAMPLE 1

EXAMPLE 1

EXAMPLE 2

EXAMPLE 3

EXAMPLE 4

PROJECTION LENS AND PROJECTION TYPE DISPLAY DEVICE USING THE SAME

CROSS-REFERENCE TO RELATED APPLICATIONS

This application is based on and claims priority under 35 USC 119 from Japanese Patent Application No. 2007-277606 filed Oct. 25, 2007; the entire contents of which are incorporated herein by reference.

BACKGROUND

1. Technical Field

The present invention relates to a projection lens which enlarges and displays display information from a light valve such as liquid crystal display element, and particularly to a projection lens suitable for a front type projection type display device and a projection type display device using the same.

2. Related Art

Recently, a projection type display device using a light valve such as a liquid crystal display device or a DMD display device has been widely spread. Particularly, there has been widely used a projection type display device which uses three light valves so that the three light values correspond respectively to illumination light of RGB primaries, thereby to modulate these respective illumination light, synthesizes the light modulated by the respective light valves by means of a prism or the like, and displays an image on a screen through a projection lens.

The projection lens mounted on such the projection type display device which synthesizes the respective modulation light from the three light valves by the color-synthesized optical system and projects the synthesized light. So the projection lens requires a large back focal length in order to arrange the prism for performing color synthesis as described above and in order to avoid a thermal problem. Further, since spectral characteristic in the color-synthesized optical system changes by an angle of the incident light, it is necessary for the projection lens to have a characteristic that the entrance pupil seen from the reduction side is located far enough, that is, telecentricity. Further, it is required that the projection lens is a fast lens and aberrations are corrected in accordance with resolution of the light valve.

As projection lenses which satisfy such the demands to some degree, those disclosed in, for example, the following Patent Documents 1 (JP-A-2003-015033 corresponding to U.S. Pat. No. 6,624,952) and Patent Document 2 (JP-A-2004-326079 corresponding to U.S. Pat. No. 6,947,222) have been known. Further, this applicant has already disclosed such the projection lens to the Japanese Patent Office (refer to the following Patent Document 3 (Japanese Patent Application No. 2007-157248)).

The projection lenses described in these Patent Documents are wide-angle lenses in which an angle of view is 100 degrees or more.

As the projection type display device, there have been known a front type device which has a projection lens arranged on the same side as the viewer side in relation to a screen and images the light emitted from the projection lens on a reflection type screen, and a rear type device which has a projection lens arranged so as to interpose a screen between a viewer and the projection lens and images the light emitted from the projection lens on a transmission type screen.

In the rear type projection type display device of their types, there has been known well such the construction that parts from a light source to a screen are accommodated in a cabinet like a rear projection television, and that the light carrying picture information is projected toward the screen disposed in front of the cabinet from a projection lens disposed in a back of the cabinet. The projection lenses disclosed in the above Patent Documents 1 to 3 assume that they are mounted on such the rear type projection type display device.

However, in such the projection lens in the rear type device, in order to reduce the thickness of the cabinet, a prism or a mirror for turning back an optical axis is arranged in a lens system, and a full lens length along the optical axis becomes long, so that increase in spatial size of the device is caused. Accordingly, in case that the projection lenses described in the above Patent Documents are used in the front type projection type display device, there is a problem that compactification of the device size cannot be realized.

Further, the front type projection type display system (including the display device and the screen), compared with the rear type, has limits in size of installation space of the system. Therefore, it is desired that the working distance from the display device to the screen is shorten, and it is required that a wider viewing angle of the projection lens is realized.

The invention has been made in view of such circumstances, and its object is to provide a high-resolution projection lens which has the reduction side constituted telecentrically and a back focal length suitable to recent projection lenses, and is capable of realizing compactification and a wider viewing angle as the entirety of a lens system so that this lens can be applied also to a projection lens in a front type projection type display device; and to provide a projection type display device using this projection lens.

SUMMARY

According to an aspect of the invention, a projection lens includes in order from the magnification side, a first lens group having negative refractive power and a second lens group having positive refractive power. An aspheric lens is arranged on the most magnification side of the first lens group. The projection lens is substantially telecentric on a reduction side. The following conditional expressions (1) and (2) are satisfied:

$$3 < Bf/f \qquad (1)$$

$$0.4 < H/L \qquad (2)$$

where f denotes a focal length of the projection lens, Bf denotes an air-converted back focal length, H denotes a height of a principal ray at the maximum angle of view on a plane (i) which is orthogonal to an optical axis and (ii) which passes through a vertex of a lens surface on the most magnification side on the optical axis, and L denotes a length from the vertex of the lens surface on the most magnification side on the optical axis to a vertex of a lens surface on the most reduction side on the optical axis.

Further, it is preferable that the following conditional expressions (2') and (3) are satisfied:

$$0.5 < H/L \qquad (2')$$

$$110° < 2\omega \qquad (3)$$

where $\omega$ denotes a half angle of view.

Further, it is preferable that the second lens group includes at least two cemented surfaces, and at least two positive lenses each of which is formed of material having an Abbe number of 75 or more at the d-line.

Further, it is preferable that the second lens group has at least one aspheric surface.

Further, it is preferable that: a cemented lens formed by cementing a negative lens and a positive lens is arranged on the most reduction side of the first lens group; and when focusing is performed, at least the cemented lens is moved in the direction of the optical axis. Alternatively, it is preferable that a cemented lens formed by cementing a negative lens and a positive lens is arranged on the most reduction side of the first lens group, and when focusing is performed, the cemented lens and all or a part of lenses other than the cemented lens in the first lens group are moved in the direction of the optical axis independently of each other.

Further, in the projection lens, it is preferable that the following conditional expressions (4) and (5) are satisfied:

$$-5 < f_1/f < -1 \quad (4)$$

$$f_2/f < 10 \quad (5)$$

where $f_1$ denotes a focal length of the first lens group, and $f_2$ denotes a focal length of the second lens group.

Further, it is preferable that the first lens group includes, in order from the magnification side, an aspheric lens formed of plastic, at least one negative meniscus lens having a convex surface facing to the magnification side, a negative lens having a concave surface facing to the reduction side, and a cemented lens formed by a positive lens and a negative lens.

Further, it is preferable that the cemented lens in the first lens group satisfies the following conditional expression (6):

$$|N_p - N_n| < 0.1 \quad (6)$$

where $N_p$ denotes a refractive index of the positive lens of the cemented lens, and $N_n$ denotes a refractive index of the negative lens of the cemented lens.

Furthermore, a projection type display device of the invention includes a light source, a light valve, an illumination optical portion that guides luminous flux from the light source to the light valve, and any of the above projection zoom lenses. The luminous flux from the light source is optically modulated by the light valve and projected onto a screen by the projection zoom lens.

Since the projection lens of the invention has the above constitution, the reduction side is made telecentric, and a good aberration correcting function can be realized.

Further, since the above conditional expression (1) is satisfied, the back focal length suitable to recent projection lenses can be secured. Further, since the above conditional expression (2) is satisfied, it is possible to attain compactification of the entire lens system while realizing a wider viewing angle Further, the projection type display device of the invention, since uses the projection lens of the invention, can be provided as a high-resolution display device which corrects satisfactorily various aberrations and can attain the compactification.

DETAILED DESCRIPTION

Figure 1:
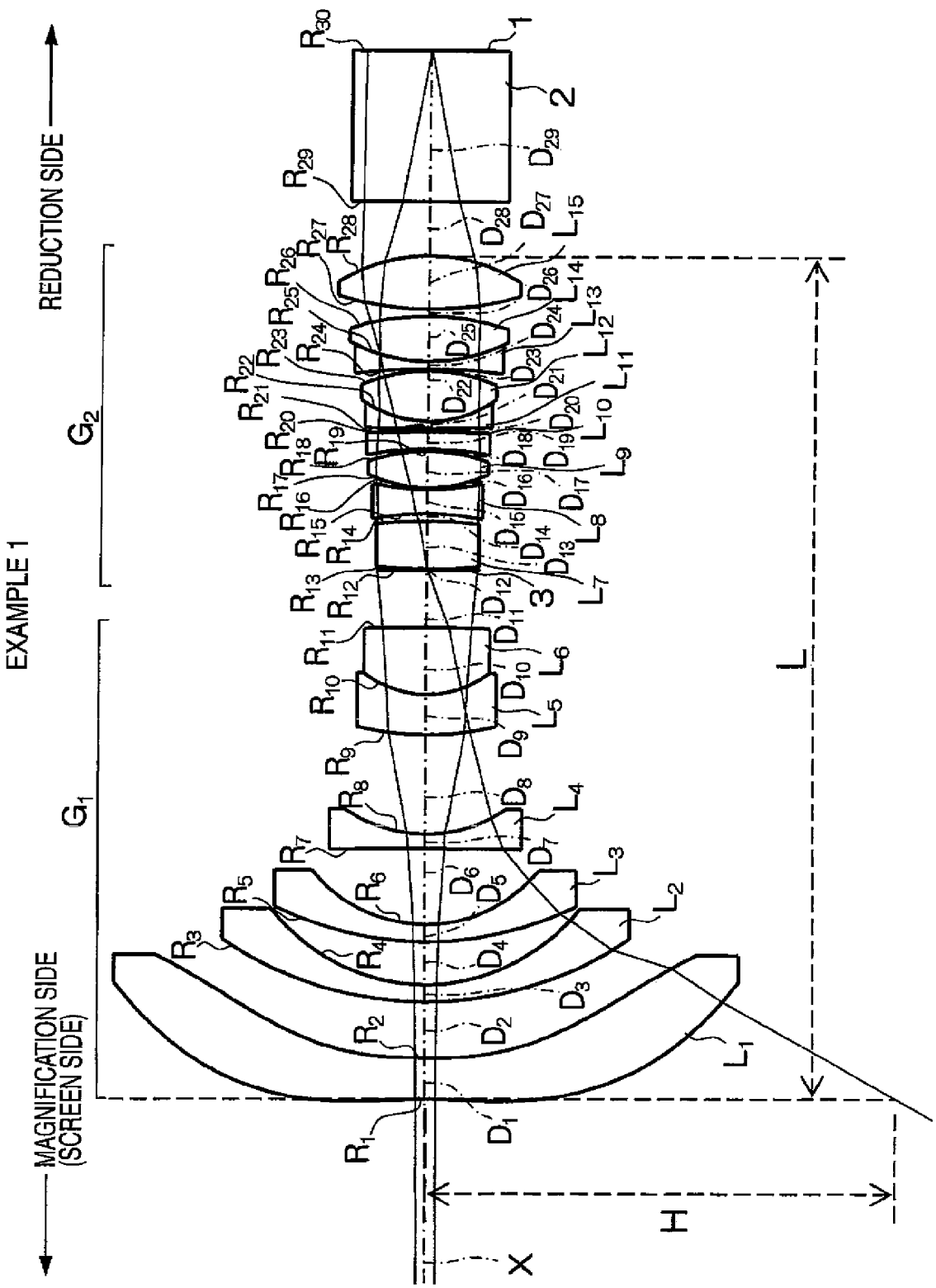
FIG. 1 is a diagram showing configuration of a projection lens according to an example 1 of the invention.

Embodiments of the invention will be described below with reference to drawings. FIG. 1 shows lens configuration in an example 1 which will be described later. As a example of this embodiment, a projection lens according to the example 1 will be explained below. In the figures, a character X represents an optical axis.

The projection lens in this embodiment is configured so that a first lens group $G_1$ having negative refractive power and a second lens group $G_2$ having positive refractive power are arranged in order from the magnification side. And the projection lens is substantially telecentric on the reduction side. Further, on the most magnification side of the first lens group $G_1$, an aspheric lens is arranged. And the first lens group $G_1$ is substantially telecentric on the reduction side of this lens system. In FIG. 1, loci of a paraxial ray and an incident ray having the maximum angle of view are shown (which is the same in FIGS. 2 to 6).

As described above, by providing the aspheric lens on the most magnification side of the first lens group $G_1$, various aberrations can be made satisfactory.

Further, the projection lens in the embodiment is configured so as to satisfy the following conditional expressions (1) and (2).

The conditional expression (1) is a conditional expression for attaining an appropriate back focal length, and the conditional expression (2) is a conditional expression for compactifying the entire lens system.

$$3 < Bf/f \quad (1)$$

$$0.4 < H/L \quad (2)$$

Herein, f denotes a focal length of the entire system, Bf denotes an air-converted back focal length, H denotes a height of a principal ray at the maximum angle of view on a plane (i) which is orthogonal to an optical axis, (ii) which passes through a vertex of a lens surface on the most magnification side on the optical axis (refer to FIG. 1), and L denotes a length from the vertex of the lens surface on the most magnification side on the optical axis to a vertex of a lens surface on the optical axis on the most reduction side (refer to FIG. 1).

Further, on the most reduction side of the first lens group $G_1$, a cemented lens is arranged. Further, the second lens group $G_2$ includes at least two sets of cemented lenses (in examples 1 to 4, the second lens group $G_2$ includes at least two cemented lenses of which each is formed by two lenses, and in examples 5 and 6, the second lens group $G_2$ includes at least two cemented lenses of which each is formed by three lenses) Hereby, the lateral chromatic aberration can be corrected satisfactory.

In fifth and sixth examples described later, the second lens group $G_2$ includes at least two cemented lenses of which each is formed by three lenses (of which at least two lenses are positive lenses each having two cemented surfaces). These positive lenses are formed of material having an Abbe number of 75 or more. By such the configuration, the lateral chromatic aberration can be more satisfactorily corrected. Further, in place of the above two cemented lens, there may be arranged a cemented lens formed by four lenses of which two are positive lenses each having two cemented surfaces and are put between the others.

Further, the first lens group $G_1$ includes, in order from the magnification side, an aspheric lens (first lens $L_1$) formed of plastics (or glass), at least one negative meniscus lens whose convex surface is directed to the magnification side (in the examples 1 to 4, a second lens $L_2$ and a third lens $L_3$; and in the examples 5 and 6, a second lens $L_2$), a negative lens whose concave surface is directed to the reduction side (in the examples 1 to 4, a fourth lens $L_4$; and in the examples 5 and 6, a third lens $L_3$), and a cemented lens formed by a negative lens and a positive lens (in the examples 1 to 4, a fifth lens $L_5$ and a sixth lens $L_6$; and in the examples 5 and 6, a fourth lens $L_4$ and a fifth lens $L_5$).

In the projection lens of FIG. 1, the luminous flux which has been incident from the right side of FIG. 1 and has received image information on a light valve (image display surface) 1 is incident through a glass block 2 on this projection lens, and is magnified and projected in the left direction of FIG. 1 by this projection lens. In FIG. 1, for ease of view, only one light valve 1 is described. However, there is an example of a projection type display device, in which the luminous flux from a light source is separated into primary color lights by a color separation optical system, and three light valves are disposed for the respective primary color lights thereby to enable display of a full color image. In the position of the glass block 2, a color synthesizing unit such as a cross dichroic prism is disposed, whereby these primary color lights can be synthesized.

It is preferably that the projection lens in this embodiment is configured so that at least the cemented lens in the first lens group $G_1$ is moved in the direction of the optical axis X (corresponding to the example 6), or the cemented lens in the first lens group $G_1$ and all or a part of other lenses in the first lens group $G_1$ than its cemented lens are moved in the direction of the optical axis X independently of each other (corresponding to the example 3), thereby to adjust focusing. Hereby, it is possible to prevent deterioration in lateral chromatic aberration while focusing.

Further, it is preferable that the projection in the embodiment satisfies the following conditional expressions (3) to (6).

$$110° < 2\omega \tag{3}$$

$$-5 < f_1/f < -1 \tag{4}$$

$$f_2/f < 10 \tag{5}$$

$$|N_p - N_n| < 0.1 \tag{6}$$

Herein, $\omega$ denotes a half angle of view, f denotes a focal length of the entire system, $f_1$ denotes a focal length of the first lens group $G_1$, $f_2$ denotes a focal length of the second lens group $G_2$, $N_p$ denotes a refractive index of the positive lens of the cemented lens in the first lens group $G_1$, and $N_n$ denotes a refractive index of the negative lens of the cemented lens in the first lens group $G_1$.

By the above constitution, in the projection lens in the embodiment and the projection type display device using this projection lens, the projection lens is constituted telecentric on the reduction side, the back focal length suitable to the recent projection lenses is obtained, and chromatic aberration is satisfactorily corrected at as wide as 110° or more angle of view, so that it is possible to attain compactification of the entirety of the lens system, and to improve resolution.

Further, though it is generally difficult for a super wide-angle lens to keep performance by focusing, it is demanded that the front type projection lens satisfies the good optical performance throughout the focusing range. Since the projection lens in the embodiment has the above constitutional elements, it can meet sufficiently such the demand.

Further, since the above constitutional elements are set in association with one another, their operational advantages and also various operational advantages are obtained by satisfying all of the above conditions. The conditional expressions (1) to (6) which give comparatively large influences to the respective operational advantages will be described below.

The conditional expression (1) defines the back focal length of this projection lens, and sets the sufficient back focal length required as space for arranging a prism for color synthesis on the reduction side of the projection lens. Further, this space can avoid also a thermal problem. If Bf/f falls down the lower limit, the insertion of the prism for color synthesis becomes difficult and thus the thermal problem cannot be avoided surely.

The conditional expression (2) defines a range of the value obtained by dividing H (the height of a principal ray at the maximum angle of view on a plane which (i) is orthogonal to an optical axis and (ii) passes through a vertex of a lens surface on the most magnification side on the optical axis) by L (length from the vertex of the lens surface on the most magnification side on the optical axis to a vertex of a lens surface on the most reduction side on the optical axis), and defines the range in which the compactification of the entire lens system can be attained while realizing a wider angle of view.

Namely, if H/L falls down the lower limit 0.4 and departs from the range of the conditional expression (2), it becomes difficult to correct satisfactorily the image surface on the entirety of the screen, and also difficult to correct distortion. To the contrary, by satisfying the conditional expression (2), it becomes possible to correct effectively various aberrations in the super wide-angle lens, and it is possible to attain the compactification of the entire lens system.

Further, by satisfying the following conditional expression (2') in place of the conditional expression (2), realization of the wider viewing angle and compactification of the entire lens system can be further promoted.

$$0.5 < H/L \tag{2'}$$

Further, the conditional expression (3) defines a range of the angle of view which can be satisfactorily applied also to the projection lens in the front type projection type display device.

Namely, since the front type projection type display device has limits in installation space of the display system including the screen, it is demanded that the working distance from the display device to the screen is shorten. The projection lens in the embodiment is, in order to meet this demand, constituted so that realization of the wider viewing angle and compactification are possible.

Further, the conditional expression (4) defines a ratio of the focal length $f_1$ of the first lens group $G_1$ to the focal length f of the entire system. If $f_1/f$ falls down the lower limit, the power of the first lens group $G_1$ becomes too small, so that it becomes difficult to correct lateral chromatic aberration. On the other hand, if $f_1/f$ exceeds the upper limit, the power of the first lens group $G_1$ becomes too large, so that it becomes difficult to correct various aberrations such as spherical aberration and comatic aberration.

Further, by satisfying the following conditional expression (4') in place of the conditional expression (4), the advantages obtained by satisfying the conditional expression (4) can be made better.

$$-3 < f_1/f < -1.5 \tag{4'}$$

Further, the conditional expression (5) defines a ratio of the focal length $f_2$ of the second lens group $G_2$ to the focal length f of the entire system. If $f_2/f$ exceeds the upper limit, the power of the second lens group $G_2$ becomes too small, so that it becomes difficult to correct the various aberrations such as spherical aberration and comatic aberration. Further, a full length of the entire lens system becomes too large, and the compactification cannot be realized, so that the lens in this case is not preferable as the front type projection lens.

Further, the conditional expression (6) defines a range of the absolute value of a difference between a refractive index $N_p$ of the positive lens of the cemented lens in the first lens group $G_1$, and a refractive index $N_n$ of the negative lens of the cemented lens in the first lens group $G_1$. If $|N_p-N_n|$ exceeds the upper limit, it becomes difficult to correct satisfactorily the image surface when focusing.

Figure 13:
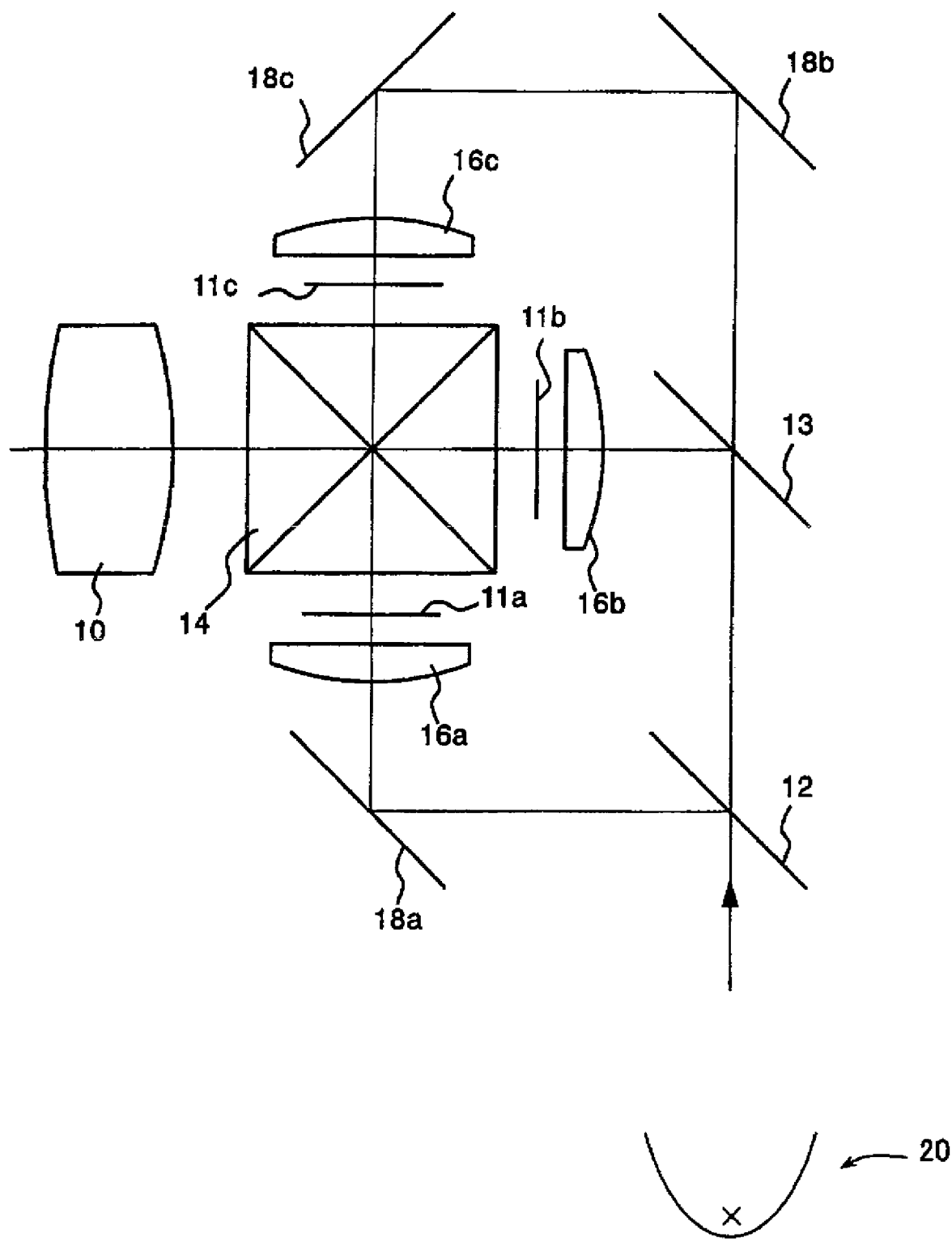
FIG. 13 is a schematic configurative view of a portion of a projection type display device of the invention.

Next, an example of a projection type display device mounted with the above projection lens will be described with reference to FIG. 13. The projection type display device shown in FIG. 13 includes transmission type liquid crystal panels 11a to 11c as light valves, and uses the above projection lens according to the above-mentioned embodiment as a projection lens 10. Further, between a light source 20 and a dichroic mirror 12, an integrator (not shown) such as a fly eye is disposed. A white light from a light source 20 is incident on the liquid crystal panels 11a to 11c respectively corresponding to there-color luminous fluxes (G light, B light, R light) via an illumination optical system, then modulated optically, then color-synthesized by a cross dichroic prism 14, and then projected onto a screen (not shown) by the projection lens 10. This device includes dichroic mirrors 12, 13 for color separation, the cross dichroic prism 14 for color synthesis, condenser lenses 16a to 16c, and total reflection mirrors 18a to 18c. Since this projection type display device uses the projection lens according to the embodiment, it can become a projection type display device which can provide a good quality of the projected image at a wide angle of view and is bright and compact.

The specified examples of the projection lens according to the invention will be described below. In the drawings showing the configuration from an example 2 on, members making the similar operational advantages to those in an example 1 are denoted by the similar reference characters to those used in FIG. 1. Further, each numeral value shown in the following examples is a numeral value normalized under the assumption that a focal length is set to 1.0.

EXAMPLE 1

As shown in FIG. 1, in a projection lens according to an example 1, a first lens group $G_1$ having negative refractive power and a second lens group $G_2$ having positive refractive power are arranged in order from the magnification side. The projection lens is substantially telecentric on the reduction side.

The first lens group $G_1$ includes, in order from the magnification side, a first lens $L_1$ formed of a plastic aspheric lens having small refractive power (mainly for the purpose of aberration correction), a second lens $L_2$ and a third lens $L_3$ of which each is formed of a negative meniscus lens whose convex surface is directed to the magnification side, a fourth lens $L_4$ formed of a biconcave lens, and a cemented lens formed by two lenses which are a fifth lens $L_5$ formed of a negative meniscus lens whose concave surface is directed to the reduction side and a sixth lens $L_6$ formed by a biconvex lens.

On the other hand, the second lens group $G_2$ includes a seventh lens $L_7$ formed of a biconvex lens, an eighth lens $L_8$ formed of a biconcave lens, a ninth lens $L_9$ formed of a biconvex lens, a tenth lens $L_{10}$ formed of a plastic aspheric lens having the meniscus shape whose concave surface is directed to the magnification side, a cemented lens formed by two lenses which are an eleventh lens $L_{11}$ formed of a negative meniscus lens whose concave surface is directed to the reduction side and a twelfth lens $L_{12}$ formed of a biconvex lens, a cemented lens formed by two lenses which are a thirteenth lens $L_{13}$ formed of a biconcave lens and a fourteenth lens $L_{14}$ formed of a biconvex lens, and a fifteen lens $L_{15}$ formed of a biconvex lens. Further, an aperture diaphragm 3 is disposed on the most magnification side in the second group $G_2$.

The shapes of the above respective aspheric surfaces are defined by the following aspheric formula. Regarding the first lens $L_1$ and the tenth lens $L_{10}$ each having the aspheric surface, even in case that either surface of the lens is the aspheric surface, the advantages can be obtained. However, it is more preferable that both surfaces are the aspheric surfaces.

$$Z = \frac{Y^2/R}{1+\sqrt{1-K \times Y^2/R^2}} + \sum_{i=3}^{12} A_i Y^i$$

where Z denotes a length of a perpendicular line drawn from a point on an aspheric surface at a distance Y from an optical axis to a tangent plane (a plane perpendicular to the optical axis) of a vertex of the aspheric surface; Y denotes a distance from the optical axis; R denotes a radius of curvature of the aspheric surface near in the vicinity of optical axis; K denotes an eccentricity; and Ai denotes an aspheric coefficient (i=3 to 12).

The projection lens according to the example 1 is configured so as to satisfy the above conditional expressions (1) to (6). However, regarding the conditional expressions (2) and (4), the projection lens is configured so as to satisfy the above conditional expressions (2') and (4') in which the limit value is set to more preferable numeral value.

Regarding the projection lens in the example 1, radii R of curvature of respective lens surfaces (normalized under the assumption that a focal length of the entire lens system is set to 1.0: the same rule applies to the following examples), center thicknesses of the respective lenses and air distances D (hereinafter referred to as "on-axis surface spacing") between the respective lenses (normalized under the assumption that a focal length of the entire lens system is set to 1.0: the same rule applies to the following examples), and refractive indices $N_d$ and Abbe numbers $\nu_d$ of the respective lenses at the d-line are given on the upper portion of a table 1. Further, in the table 1 and the following tables, numerals of surface number represent order from the magnification side, and the surface in which a mark * is given to the left side of the surface number is formed into the aspheric surface. In the example 1 and the following examples 2 to 6, radii R of curvature of these aspheric surfaces are shown in each table as values of radii R of curvature on the optical axis X. However, in the corresponding lens configurative view, in order to see the drawing easily, the drawn line is not always drawn from an intersection with the optical axis X.

Further, values of respective contacts K, and $A_3$ to $A_{12}$ corresponding to the respective aspheric surfaces are given on the middle portion of the table 1. Further, a projection length (a length from a magnification-side conjugate position to a lens first surface) in the numerical data in the upper portion of the table 1 is given on the lower portion of the table 1.

Values corresponding to the respective conditional expressions (1) to (6) in the example 1 are as shown in a table 7 described later, and their values satisfy all the conditional expressions (1) to (6) (satisfy also the conditional expression (2') and (4')).

EXAMPLE 2

Figure 2:
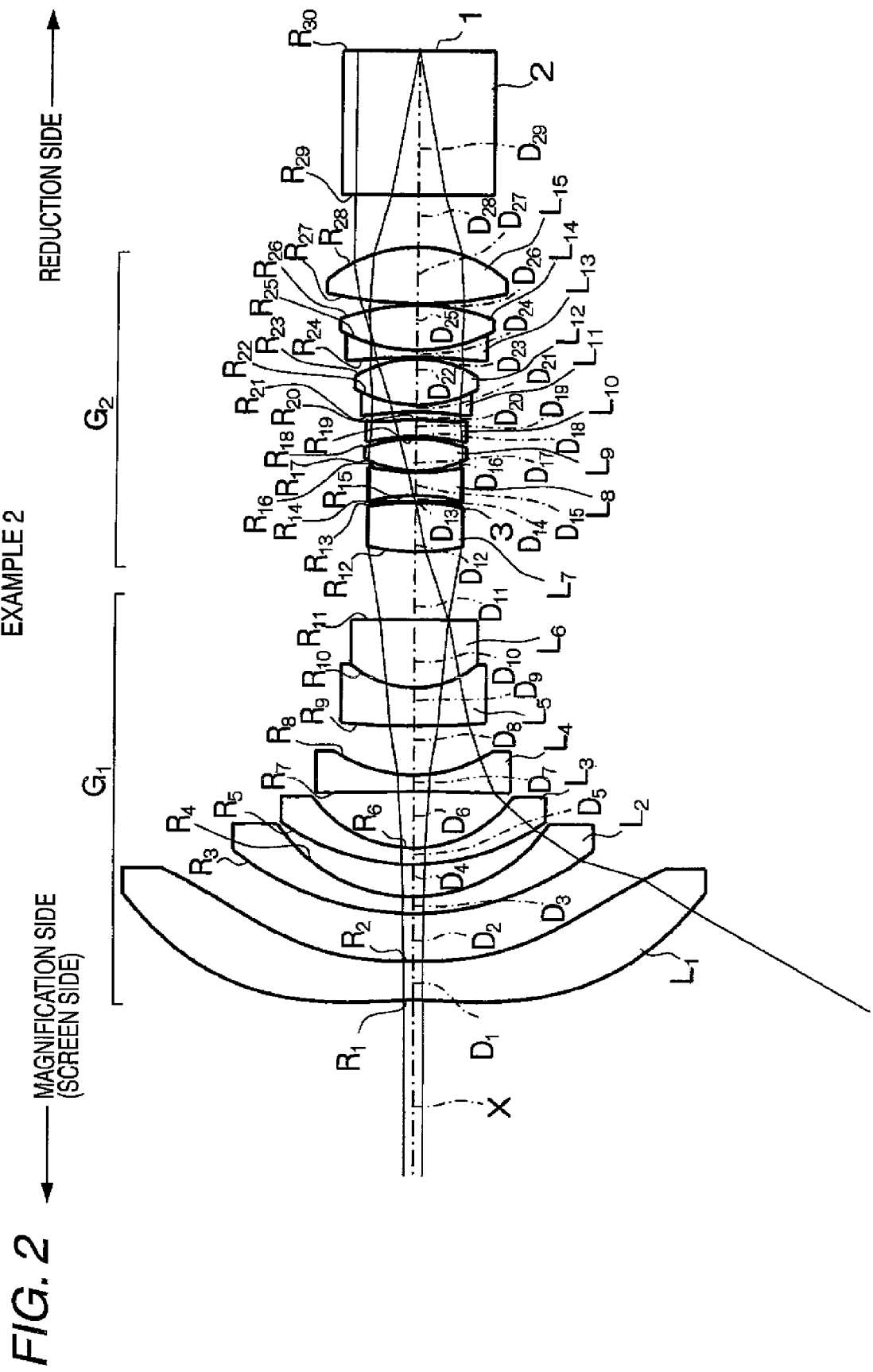
FIG. 2 is a diagram showing configuration of a projection lens according to an example 2 of the invention.

A projection lens according to an example 2 is as shown in FIG. 2. This projection lens has substantially similar constitution to the constitution of the projection lens in the example 1, and the explanation of the common portions is omitted.

Namely, the projection lens in the example 2 is different from the projection lens in the example 1 in a point that the aperture diaphragm 3 is disposed between the seventh lens $L_7$ on the most magnification side in the second lens group $G_2$ and the eighth lens $L_8$ located on the reduction side of the

TABLE 1

|   | R | D | $N_d$ | $\nu_d$ |
|---|---|---|---|---|
| 1* | −11.377 | 1.115 | 1.491 | 57.6 |
| 2* | 51.081 | 1.524 | | |
| 3 | 9.705 | 0.478 | 1.713 | 53.9 |
| 4 | 5.238 | 1.152 | | |
| 5 | 9.025 | 0.478 | 1.773 | 49.6 |
| 6 | 3.925 | 2.068 | | |
| 7 | −232.720 | 0.390 | 1.806 | 33.3 |
| 8 | 3.840 | 2.724 | | |
| 9 | 7.856 | 1.115 | 1.773 | 49.6 |
| 10 | 2.782 | 1.834 | 1.689 | 31.1 |
| 11 | −46.823 | 1.593 | | |
| 12 | ∞ | 0.000 (AD) | | |
| 13 | 10.601 | 1.318 | 1.847 | 23.8 |
| 14 | −13.723 | 0.211 | | |
| 15 | −7.464 | 0.655 | 1.773 | 49.6 |
| 16 | 6.765 | 0.048 | | |
| 17 | 3.778 | 1.013 | 1.487 | 70.2 |
| 18 | −4.802 | 0.048 | | |
| 19* | −10.986 | 0.478 | 1.510 | 56.2 |
| 20* | −20.680 | 0.092 | | |
| 21 | 57.342 | 0.191 | 1.773 | 49.6 |
| 22 | 3.146 | 1.374 | 1.497 | 81.6 |
| 23 | −4.625 | 0.048 | | |
| 24 | −17.109 | 0.207 | 1.805 | 25.4 |
| 25 | 4.653 | 1.239 | 1.497 | 81.6 |
| 26 | −6.820 | 0.186 | | |
| 27 | 8.395 | 1.450 | 1.497 | 81.6 |
| 28 | −4.721 | 1.481 | | |
| 29 | ∞ | 4.101 | 1.517 | 64.2 |
| 30 | ∞ | | | |

| Aspheric coefficients | | | | | |
|---|---|---|---|---|---|
| | K | $A_3$ | $A_4$ | $A_5$ | $A_6$ | $A_7$ |
| 1 | 0.000 | $1.404 \times 10^{-2}$ | $1.596 \times 10^{-3}$ | $-7.808 \times 10^{-4}$ | $9.079 \times 10^{-5}$ | $7.207 \times 10^{-7}$ |
| 2 | 0.000 | $1.843 \times 10^{-2}$ | $-2.058 \times 10^{-3}$ | $2.051 \times 10^{-4}$ | $-2.416 \times 10^{-5}$ | $-2.521 \times 10^{-6}$ |
| 19 | 1.000 | 0.000 | $-4.477 \times 10^{-3}$ | $2.586 \times 10^{-4}$ | $-2.264 \times 10^{-5}$ | $-8.441 \times 10^{-5}$ |
| 20 | 1.000 | 0.000 | $5.317 \times 10^{-3}$ | $-2.494 \times 10^{-4}$ | $1.353 \times 10^{-5}$ | $4.643 \times 10^{-5}$ |

| | $A_8$ | $A_9$ | $A_{10}$ | $A_{11}$ | $A_{12}$ |
|---|---|---|---|---|---|
| 1 | $-6.669 \times 10^{-7}$ | $-1.103 \times 10^{-8}$ | $3.218 \times 10^{-9}$ | $5.596 \times 10^{-10}$ | $-5.199 \times 10^{-11}$ |
| 2 | $1.784 \times 10^{-7}$ | $6.377 \times 10^{-8}$ | $-4.543 \times 10^{-9}$ | $-9.131 \times 10^{-12}$ | $-3.341 \times 10^{-12}$ |
| 19 | $-6.405 \times 10^{-7}$ | $-8.751 \times 10^{-8}$ | $-2.490 \times 10^{-9}$ | | |
| 20 | $4.689 \times 10^{-7}$ | $6.702 \times 10^{-8}$ | $1.920 \times 10^{-9}$ | | |

| Length from magnification-side conjugate position in above data to lens first surface | 154.490 |
|---|---|

*Aspheric surface
AD Aperture diaphragm seventh lens $L_7$, and in a point that the eleventh lens $L_{11}$ is a biconcave lens.

Regarding the projection lens in the example 2, radii R of curvature of respective lens surfaces, on-axis surface spacing D between the respective lenses, and refractive indices $N_d$ and Abbe numbers $v_d$ of the respective lenses at the d-line are given on the upper portion of a table 2. Further, values of respective contacts K, and $A_3$ to $A_{12}$ corresponding to the respective aspheric surfaces are given on the middle portion of the table 2. Further, a projection length (a length from a magnification-side conjugate position to a lens first surface) in the numerical data in the upper portion of the table 2 is given on the lower portion of the table 2.

EXAMPLE 3

Figure 3:
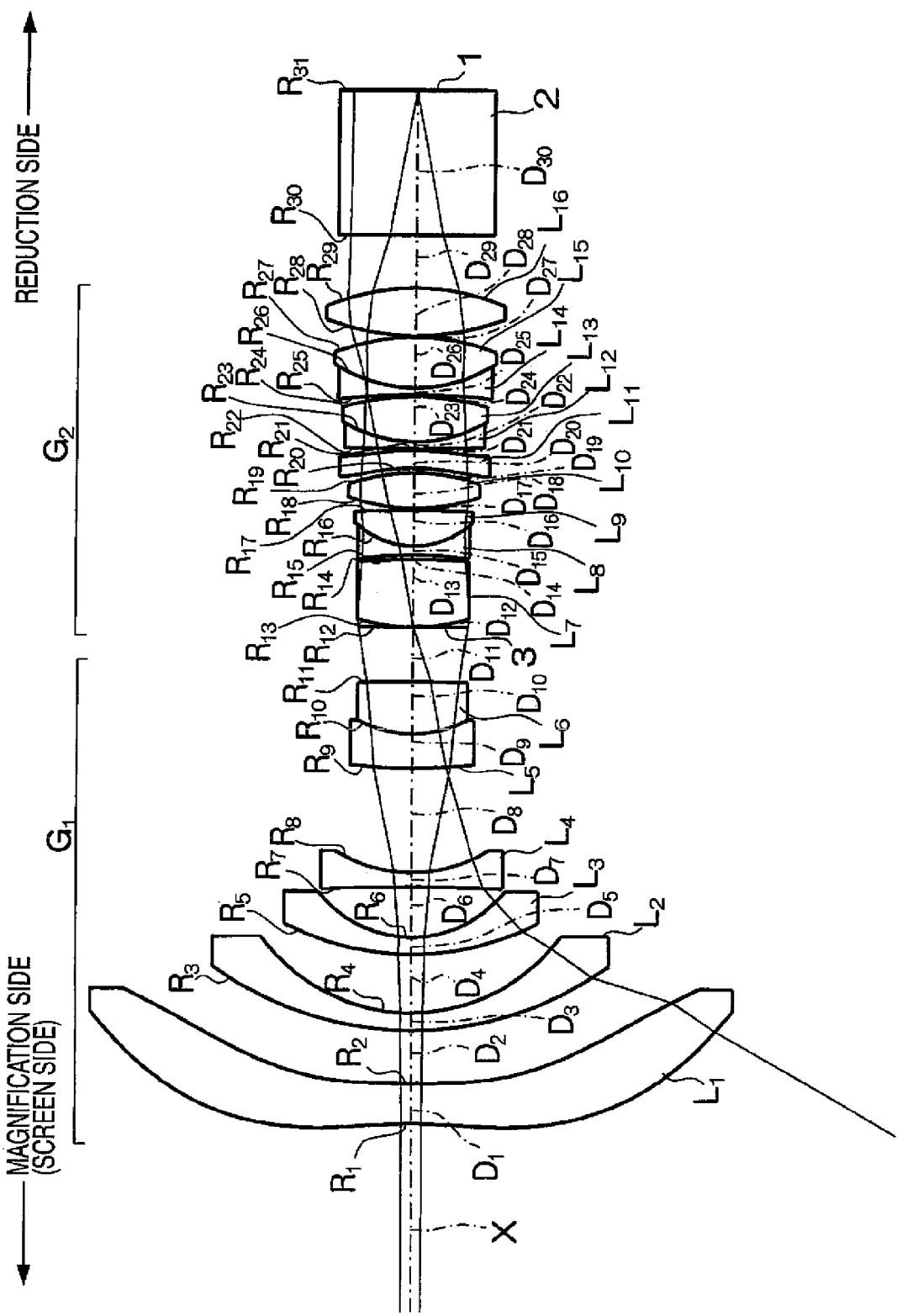
FIG. 3 is a diagram showing configuration of a projection lens according to an example 3 of the invention.

A projection lens according to an example 3 is as shown in FIG. 3. This projection lens has substantially similar constitution to the constitution of the projection lens in the example 1, and the explanation of the common portions is omitted. This projection lens is different from the projection lens in the example 1 in a point that in place of the eighth lens $L_8$ in the second lens group $G_2$ in the example 1, a cemented lens formed by two lenses which are an eighth lens $L_8$ formed of a biconcave lens and a ninth lens $L_9$ formed of a biconvex lens is provided. Lenses from a tenth lens $L_{10}$ on in FIG. 3 correspond to the respective lenses in the example 1 whose lens numbers are advanced one by one.

Regarding the projection lens in the example 3, radii R of curvature of respective lens surfaces, on-axis surface spacing D between the respective lenses, and refractive indices $N_d$ and

TABLE 2

|  | R | D | $N_d$ | $v_d$ |
| --- | --- | --- | --- | --- |
| 1* | −11.390 | 1.116 | 1.491 | 57.6 |
| 2* | 54.080 | 1.366 |  |  |
| 3 | 8.023 | 0.479 | 1.713 | 53.9 |
| 4 | 4.580 | 0.925 |  |  |
| 5 | 6.370 | 0.479 | 1.773 | 49.6 |
| 6 | 3.511 | 1.615 |  |  |
| 7 | −79.300 | 0.481 | 1.805 | 25.4 |
| 8 | 4.030 | 1.410 |  |  |
| 9 | 22.400 | 1.110 | 1.773 | 49.6 |
| 10 | 2.757 | 1.964 | 1.689 | 31.1 |
| 11 | −146.066 | 1.964 |  |  |
| 12 | 6.310 | 1.420 | 1.847 | 23.8 |
| 13 | −6.990 | 0.000 |  |  |
| 14 | ∞ | 0.195 (AD) |  |  |
| 15 | −4.990 | 0.658 | 1.773 | 49.6 |
| 16 | 5.931 | 0.048 |  |  |
| 17 | 3.210 | 0.923 | 1.487 | 70.2 |
| 18 | −4.368 | 0.068 |  |  |
| 19* | −4.920 | 0.480 | 1.510 | 56.2 |
| 20* | −6.220 | 0.224 |  |  |
| 21 | −10.300 | 0.191 | 1.806 | 40.9 |
| 22 | 3.520 | 1.332 | 1.497 | 81.6 |
| 23 | −3.224 | 0.048 |  |  |
| 24 | −17.000 | 0.193 | 1.805 | 25.4 |
| 25 | 4.600 | 1.292 | 1.497 | 81.6 |
| 26 | −6.036 | 0.048 |  |  |
| 27 | 11.400 | 1.630 | 1.497 | 81.6 |
| 28 | −3.940 | 1.476 |  |  |
| 29 | ∞ | 4.106 | 1.517 | 64.2 |
| 30 | ∞ |  |  |  |

| Aspheric coefficients | | | | | |
| --- | --- | --- | --- | --- | --- |
|  | K | $A_3$ | $A_4$ | $A_5$ | $A_6$ | $A_7$ |
| 1 | 0.000 | $1.464 \times 10^{-2}$ | $1.391 \times 10^{-3}$ | $-7.448 \times 10^{-4}$ | $8.970 \times 10^{-5}$ | $4.660 \times 10^{-7}$ |
| 2 | 0.000 | $1.888 \times 10^{-2}$ | $-2.263 \times 10^{-3}$ | $2.328 \times 10^{-4}$ | $-2.492 \times 10^{-5}$ | $-2.738 \times 10^{-6}$ |
| 19 | 1.000 | 0.000 | $1.380 \times 10^{-2}$ | $3.102 \times 10^{-3}$ | $3.367 \times 10^{-3}$ | $-3.984 \times 10^{-3}$ |
| 20 | 1.000 | 0.000 | $3.106 \times 10^{-2}$ | $5.378 \times 10^{-3}$ | $-1.007 \times 10^{-3}$ | $2.838 \times 10^{-4}$ |

|  | $A_8$ | $A_9$ | $A_{10}$ | $A_{11}$ | $A_{12}$ |
| --- | --- | --- | --- | --- | --- |
| 1 | $-6.661 \times 10^{-7}$ | $-6.529 \times 10^{-9}$ | $3.303 \times 10^{-9}$ | $4.719 \times 10^{-10}$ | $-4.710 \times 10^{-11}$ |
| 2 | $1.879 \times 10^{-7}$ | $6.610 \times 10^{-8}$ | $-4.356 \times 10^{-9}$ | $-3.551 \times 10^{-11}$ | $-4.775 \times 10^{-12}$ |
| 19 | $-1.449 \times 10^{-3}$ | $1.620 \times 10^{-3}$ | $-2.626 \times 10^{-4}$ | $-9.107 \times 10^{-5}$ | $2.152 \times 10^{-5}$ |
| 20 | $-1.020 \times 10^{-3}$ | $-7.308 \times 10^{-5}$ | $-2.448 \times 10^{-5}$ | $2.364 \times 10^{-4}$ | $-7.891 \times 10^{-5}$ |

| Length from magnification-side conjugate position in above data to lens first surface | 154.767 |
| --- | --- |

*Aspheric surface
AD Aperture diaphragm

Values corresponding to the respective conditional expressions (1) to (6) in the example 2 are as shown in the table 7 described later, and their values satisfy all the conditional expressions (1) to (6) (satisfy also the conditional expression (2') and (4')).

Abbe numbers $v_d$ of the respective lenses at the d-line are given on the upper portion of a table 3. Further, values of respective contacts K, and $A_3$ to $A_{12}$ corresponding to the respective aspheric surfaces are given on the middle portion of the table 3. Further, the projection lens in this example is configured so that: when focusing, according to the projection length, a pair lens of third lens $L_3$ and fourth lens $L_4$, and a cemented lens formed by two lenses which are a fifth lens $L_5$ and a sixth lens $L_6$ move in the direction of the optical axis individually of each other. Further, a state where the predetermined lens variable spacing changes according to the projection length (length from a magnification-side conjugate position to a lens first surface) is given on the lower portion of the table 3. The numerical data on the upper portion in the table 3 shows the case that the projection length (length from a magnification-side conjugate position to a lens first surface) is 154.603.

TABLE 3

|  | R | D | $N_d$ | $v_d$ |
|---|---|---|---|---|
| 1* | −11.047 | 1.083 | 1.491 | 57.6 |
| 2* | 641.847 | 1.423 |  |  |
| 3 | 8.887 | 0.464 | 1.713 | 53.9 |
| 4 | 4.891 | 1.560 (Variable 1) |  |  |
| 5 | 7.166 | 0.464 | 1.773 | 49.6 |
| 6 | 3.125 | 1.361 |  |  |
| 7 | −63.758 | 0.387 | 1.805 | 25.4 |
| 8 | 3.869 | 2.814 (Variable 2) |  |  |
| 9 | 16.355 | 0.928 | 1.773 | 49.6 |
| 10 | 3.086 | 1.418 | 1.699 | 30.1 |
| 11 | −42.559 | 1.469 (Variable 3) |  |  |
| 12 | ∞ | 0.000 (AD) |  |  |
| 13 | 5.076 | 1.841 | 1.847 | 23.8 |
| 14 | −18.252 | 0.117 |  |  |
| 15 | −10.460 | 0.232 | 1.834 | 37.2 |
| 16 | 2.302 | 0.968 | 1.532 | 48.8 |
| 17 | −30.605 | 0.046 |  |  |
| 18 | 5.327 | 0.963 | 1.487 | 70.4 |
| 19 | −5.017 | 0.131 |  |  |
| 20* | −5.520 | 0.464 | 1.510 | 56.2 |
| 21* | −7.287 | 0.046 |  |  |
| 22 | 58.095 | 0.186 | 1.773 | 49.6 |
| 23 | 3.734 | 1.226 | 1.497 | 81.6 |
| 24 | −6.688 | 0.046 |  |  |
| 25 | −16.561 | 0.186 | 1.805 | 25.4 |
| 26 | 3.996 | 1.352 | 1.497 | 81.6 |
| 27 | −5.937 | 0.046 |  |  |
| 28 | 6.761 | 1.295 | 1.497 | 81.6 |
| 29 | −6.035 | 1.417 |  |  |
| 30 | ∞ | 3.866 | 1.517 | 64.2 |
| 31 | ∞ |  |  |  |

| Aspheric coefficients | | | | | |
|---|---|---|---|---|---|
|  | K | $A_3$ | $A_4$ | $A_5$ | $A_6$ | $A_7$ |
| 1 | 0.800 | $6.212 \times 10^{-3}$ | $3.883 \times 10^{-3}$ | $-7.525 \times 10^{-4}$ | $3.966 \times 10^{-6}$ | $1.208 \times 10^{-5}$ |
| 2 | −2.798 | $6.261 \times 10^{-3}$ | $2.704 \times 10^{-3}$ | $-5.091 \times 10^{-4}$ | $8.604 \times 10^{-6}$ | $1.364 \times 10^{-6}$ |
| 20 | 1.000 | 0.000 | $-5.251 \times 10^{-4}$ | $7.775 \times 10^{-3}$ | $-1.521 \times 10^{-3}$ | $-3.188 \times 10^{-3}$ |
| 21 | 1.000 | 0.000 | $8.360 \times 10^{-4}$ | $1.104 \times 10^{-2}$ | $-7.711 \times 10^{-3}$ | $9.036 \times 10^{-4}$ |

|  | $A_8$ | $A_9$ | $A_{10}$ | $A_{11}$ | $A_{12}$ |
|---|---|---|---|---|---|
| 1 | $-7.960 \times 10^{-7}$ | $-6.206 \times 10^{-8}$ | $4.472 \times 10^{-9}$ | $5.446 \times 10^{-10}$ | $-4.192 \times 10^{-11}$ |
| 2 | $-2.474 \times 10^{-7}$ | $5.023 \times 10^{-8}$ | $9.743 \times 10^{-10}$ | $-6.726 \times 10^{-10}$ | $3.039 \times 10^{-11}$ |
| 20 | $3.687 \times 10^{-3}$ | $-1.843 \times 10^{-3}$ | $3.962 \times 10^{-4}$ |  |  |
| 21 | $2.775 \times 10^{-3}$ | $-2.112 \times 10^{-3}$ | $4.905 \times 10^{-4}$ |  |  |

| Lens movement in focusing | | | |
|---|---|---|---|
| Length from magnification-side conjugate position in above data to lens first surface | 102.183 | 154.603 | 190.202 |
| Variable spacing 1 | 1.605 | 1.560 | 1.539 |
| Variable spacing 2 | 2.895 | 2.814 | 2.777 |
| Variable spacing 3 | 1.344 | 1.469 | 1.527 |

*Aspheric surface
AD Aperture diaphragm

Values corresponding to the respective conditional expressions (1) to (6) in the example 3 are as shown in the table 7 described later, and their values satisfy all the conditional expressions (1) to (6) (satisfy also the conditional expression (2') and (4')).

EXAMPLE 4

Figure 4:
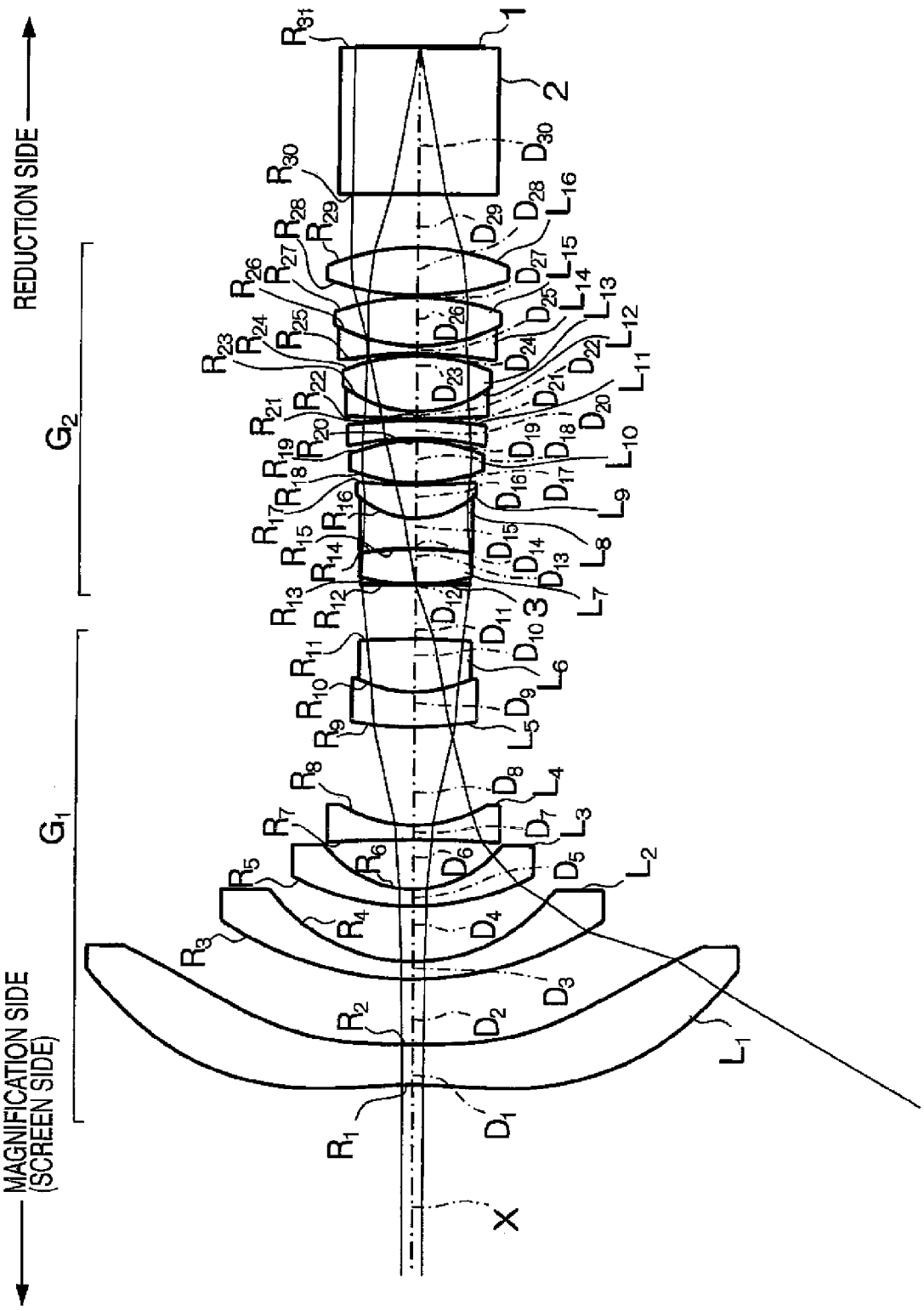
FIG. 4 is a diagram showing configuration of a projection lens according to an example 4 of the invention.

A projection lens according to an example 4 is as shown in FIG. 4. This projection lens has substantially similar constitution to the constitution of the projection lens in the example 3, and the explanation of the common portions is omitted. This projection lens is different from the projection lens in the example 3 in a point that the ninth lens $L_9$ in the second lens group $G_2$ is a positive meniscus lens whose convex surface is directed to the magnification side.

Regarding the projection lens in the example 4, radii R of curvature of respective lens surfaces, on-axis surface spacing D between the respective lenses, and refractive indices $N_d$ and Abbe numbers $\upsilon_d$ of the respective lenses at the d-line are given on the upper portion of a table 4. Further, values of respective contacts K, and $A_3$ to $A_{12}$ corresponding to the respective aspheric surfaces are given on the middle portion of the table 4. Further, a projection length (a length from a magnification-side conjugate position to a lens first surface) in the numerical data in the upper portion of the table 4 is given on the lower portion of the table 4.

described later, and their values satisfy all the conditional expressions (1) to (6) (satisfy also the conditional expression (2') and (4')).

EXAMPLE 5

Figure 5:
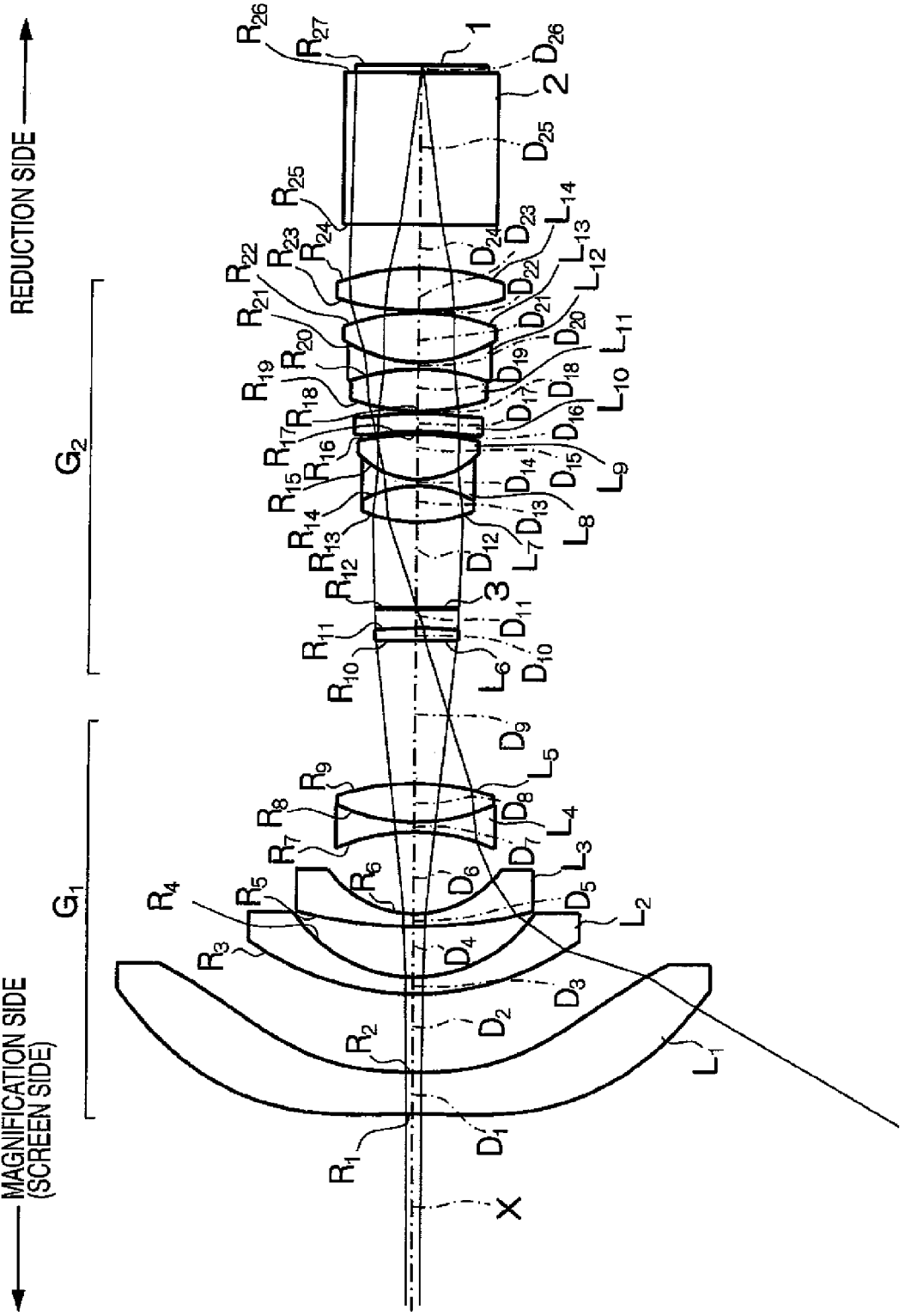
FIG. 5 is a diagram showing configuration of a projection lens according to an example 5 of the invention.

A projection lens according to an example 5 is as shown in FIG. 5. This projection lens has substantially similar constitution to the constitution of the projection lens in the example 2. However, in the projection lens in the example 5, the first lens group $G_1$ has five lenses, and two cemented lenses each of which is formed by three lenses are provided in the second lens group $G_2$.

Namely, the first lens group $G_1$ includes, in order from the magnification side, a first lens $L_1$ formed of a plastic aspheric lens having small refractive power (mainly for the purpose of

TABLE 4

| | R | D | $N_d$ | $\nu_d$ |
|---|---|---|---|---|
| 1* | −11.029 | 1.081 | 1.491 | 57.6 |
| 2* | 215.476 | 1.713 | | |
| 3 | 8.717 | 0.463 | 1.713 | 53.9 |
| 4 | 4.576 | 1.484 | | |
| 5 | 6.693 | 0.463 | 1.773 | 49.6 |
| 6 | 2.913 | 1.303 | | |
| 7 | −35.880 | 0.386 | 1.805 | 25.4 |
| 8 | 3.675 | 2.619 | | |
| 9 | 9.820 | 0.926 | 1.773 | 49.6 |
| 10 | 3.316 | 1.405 | 1.699 | 30.1 |
| 11 | −21.610 | 1.467 | | |
| 12 | ∞ | 0.000 (AD) | | |
| 13 | 5.857 | 0.939 | 1.847 | 23.8 |
| 14 | −9.096 | 0.022 | | |
| 15 | −7.959 | 0.772 | 1.834 | 37.2 |
| 16 | 2.265 | 0.903 | 1.532 | 48.8 |
| 17 | 18.476 | 0.046 | | |
| 18 | 4.729 | 1.121 | 1.487 | 70.4 |
| 19 | −4.448 | 0.062 | | |
| 20* | −7.615 | 0.463 | 1.510 | 56.2 |
| 21* | −11.452 | 0.046 | | |
| 22 | 27.975 | 0.193 | 1.773 | 49.6 |
| 23 | 3.155 | 1.479 | 1.497 | 81.6 |
| 24 | −4.903 | 0.046 | | |
| 25 | −11.730 | 0.201 | 1.805 | 25.4 |
| 26 | 4.566 | 1.291 | 1.497 | 81.6 |
| 27 | −6.325 | 0.046 | | |
| 28 | 7.147 | 1.275 | 1.497 | 81.6 |
| 29 | −5.961 | 1.402 | | |
| 30 | ∞ | 3.860 | 1.517 | 64.2 |
| 31 | ∞ | | | |

| Aspheric coefficients | | | | | |
|---|---|---|---|---|---|
| | K | $A_3$ | $A_4$ | $A_5$ | $A_6$ | $A_7$ |
| 1 | 0.800 | $6.553 \times 10^{-3}$ | $3.999 \times 10^{-3}$ | $-7.848 \times 10^{-4}$ | $2.532 \times 10^{-6}$ | $1.285 \times 10^{-5}$ |
| 2 | −2.798 | $5.776 \times 10^{-3}$ | $3.456 \times 10^{-3}$ | $-6.593 \times 10^{-4}$ | $8.928 \times 10^{-6}$ | $2.352 \times 10^{-6}$ |
| 20 | 1.000 | 0.000 | $-6.400 \times 10^{-3}$ | $7.957 \times 10^{-3}$ | $-1.635 \times 10^{-3}$ | $-3.244 \times 10^{-3}$ |
| 21 | 1.000 | 0.000 | $-3.432 \times 10^{-3}$ | $1.097 \times 10^{-2}$ | $-7.769 \times 10^{-3}$ | $8.899 \times 10^{-4}$ |

| | $A_8$ | $A_9$ | $A_{10}$ | $A_{11}$ | $A_{12}$ |
|---|---|---|---|---|---|
| 1 | $-8.092 \times 10^{-7}$ | $-6.847 \times 10^{-8}$ | $4.364 \times 10^{-9}$ | $6.097 \times 10^{-10}$ | $-4.396 \times 10^{-11}$ |
| 2 | $-1.733 \times 10^{-7}$ | $4.866 \times 10^{-8}$ | $-4.797 \times 10^{-11}$ | $-7.716 \times 10^{-10}$ | $4.272 \times 10^{-11}$ |
| 20 | $3.729 \times 10^{-3}$ | $-1.867 \times 10^{-3}$ | $4.019 \times 10^{-4}$ | | |
| 21 | $2.803 \times 10^{-3}$ | $-2.141 \times 10^{-3}$ | $4.976 \times 10^{-4}$ | | |

| Length from magnification-side conjugate position in above data to lens first surface | 149.896 |
|---|---|

*Aspheric surface
AD Aperture diaphragm

Values corresponding to the respective conditional expressions (1) to (6) in the example 4 are as shown in the table 7 aberration correction), a second lens $L_2$ formed of a negative meniscus lens whose convex surface is directed to the magnification side, a third lens $L_3$ formed of a negative meniscus lens whose concave surface is directed to the reduction side, and a cemented lens formed of two lenses which are a fourth lens $L_4$ formed of a biconcave lens and a fifth lens $L_5$ formed of a biconvex lens.

On the other hand, the second lens group $G_2$ includes a sixth lens $L_6$ formed of biconvex lens; a cemented lens formed by three lenses which are a seventh lens $L_7$ formed of a biconvex lens, an eighth lens $L_8$ formed of a biconcave lens, and a ninth lens $L_9$ formed of a biconvex lens; a tenth lens $L_{10}$ formed of a plastic aspheric lens having the meniscus shape whose concave surface is directed to the magnification side; a cemented lens formed by three lenses which are an eleventh lens $L_{11}$ formed of a biconvex lens, a twelfth lens $L_{12}$ formed of a biconcave lens, and a thirteenth lens $L_{13}$ formed of a biconvex lens; and a fifteen lens $L_{15}$ formed of a biconvex lens.

Regarding the projection lens in the example 5, radii R of curvature of respective lens surfaces, on-axis surface spacing D between the respective lenses, and refractive indices $N_d$ and Abbe numbers $\upsilon_d$ of the respective lenses at the d-line are given on the upper portion of a table 5. Further, values of respective contacts K, and $A_3$ to $A_{12}$ corresponding to the respective aspheric surfaces are given on the middle portion of the table 5. Further, a projection length (a length from a magnification-side conjugate position to a lens first surface) in the numerical data in the upper portion of the table 5 is given on the lower portion of the table 5.

TABLE 5

|    | R        | D          | $N_d$ | $\upsilon_d$ |
|----|----------|------------|-------|--------------|
| 1* | −15.582  | 1.109      | 1.491 | 57.6 |
| 2* | 19.821   | 2.063      |       |      |
| 3  | 7.261    | 0.450      | 1.773 | 49.6 |
| 4  | 3.739    | 1.351      |       |      |
| 5  | 11.797   | 0.346      | 1.847 | 23.8 |
| 6  | 2.772    | 2.164      |       |      |
| 7  | −5.088   | 0.260      | 1.623 | 58.2 |
| 8  | 4.681    | 1.041      | 1.603 | 38.0 |
| 9  | −6.559   | 3.811      |       |      |
| 10 | 526.068  | 0.336      | 1.847 | 23.8 |
| 11 | −12.338  | 0.520      |       |      |
| 12 | ∞        | 2.266 (AD) |       |      |
| 13 | 3.668    | 0.976      | 1.699 | 30.1 |
| 14 | −3.048   | 0.173      | 1.804 | 46.6 |
| 15 | 2.165    | 1.188      | 1.497 | 81.6 |
| 16 | −6.905   | 0.083      |       |      |
| 17*| −4.949   | 0.473      | 1.510 | 56.2 |
| 18*| −5.679   | 0.052      |       |      |
| 19 | 5.476    | 1.104      | 1.487 | 70.2 |
| 20 | −5.154   | 0.173      | 1.847 | 23.8 |
| 21 | 3.649    | 1.321      | 1.497 | 81.6 |
| 22 | −5.425   | 0.052      |       |      |
| 23 | 7.613    | 1.125      | 1.497 | 81.6 |
| 24 | −6.384   | 1.156      |       |      |
| 25 | ∞        | 4.018      | 1.639 | 55.4 |
| 26 | ∞        | 0.191      | 1.487 | 70.2 |
| 27 | ∞        |            |       |      |

Aspheric coefficients

|    | K      | $A_3$                  | $A_4$                  | $A_5$                   | $A_6$                   | $A_7$                   |
|----|--------|------------------------|------------------------|-------------------------|-------------------------|-------------------------|
| 1  | 0.800  | $1.272 \times 10^{-2}$ | $1.214 \times 10^{-3}$ | $-2.824 \times 10^{-4}$ | $-3.062 \times 10^{-5}$ | $1.095 \times 10^{-5}$  |
| 2  | −2.798 | $1.402 \times 10^{-2}$ | $9.241 \times 10^{-4}$ | $-3.445 \times 10^{-4}$ | $1.070 \times 10^{-6}$  | $-1.085 \times 10^{-6}$ |
| 17 | 1.000  | 0.000                  | $3.105 \times 10^{-2}$ | $-9.028 \times 10^{-3}$ | $7.487 \times 10^{-4}$  | $7.167 \times 10^{-3}$  |
| 18 | 1.000  | 0.000                  | $2.916 \times 10^{-2}$ | $-1.722 \times 10^{-2}$ | $1.547 \times 10^{-2}$  | $-8.427 \times 10^{-3}$ |

|    | $A_8$                   | $A_9$                   | $A_{10}$                | $A_{11}$                 | $A_{12}$                  |
|----|-------------------------|-------------------------|-------------------------|--------------------------|---------------------------|
| 1  | $-6.125 \times 10^{-7}$ | $-4.189 \times 10^{-8}$ | $4.655 \times 10^{-9}$  | $2.309 \times 10^{-10}$  | $-3.549 \times 10^{-11}$  |
| 2  | $-3.361 \times 10^{-7}$ | $7.771 \times 10^{-8}$  | $6.281 \times 10^{-9}$  | $-2.580 \times 10^{-10}$ | $-7.510 \times 10^{-11}$  |
| 17 | $-4.956 \times 10^{-3}$ | $5.469 \times 10^{-4}$  | $2.853 \times 10^{-4}$  |                          |                           |
| 18 | $3.808 \times 10^{-3}$  | $-1.863 \times 10^{-3}$ | $4.399 \times 10^{-4}$  |                          |                           |

| Length from magnification-side conjugate position in above data to lens first surface | 77.943 |
|---|---|

*Aspheric surface
AD Aperture diaphragm

Values corresponding to the respective conditional expressions (1) to (6) in the example 5 are as shown in the table 7 described later, and their values satisfy all the conditional expressions (1) to (6) (satisfy also the conditional expression (2') and (4')).

EXAMPLE 6

Figure 6:
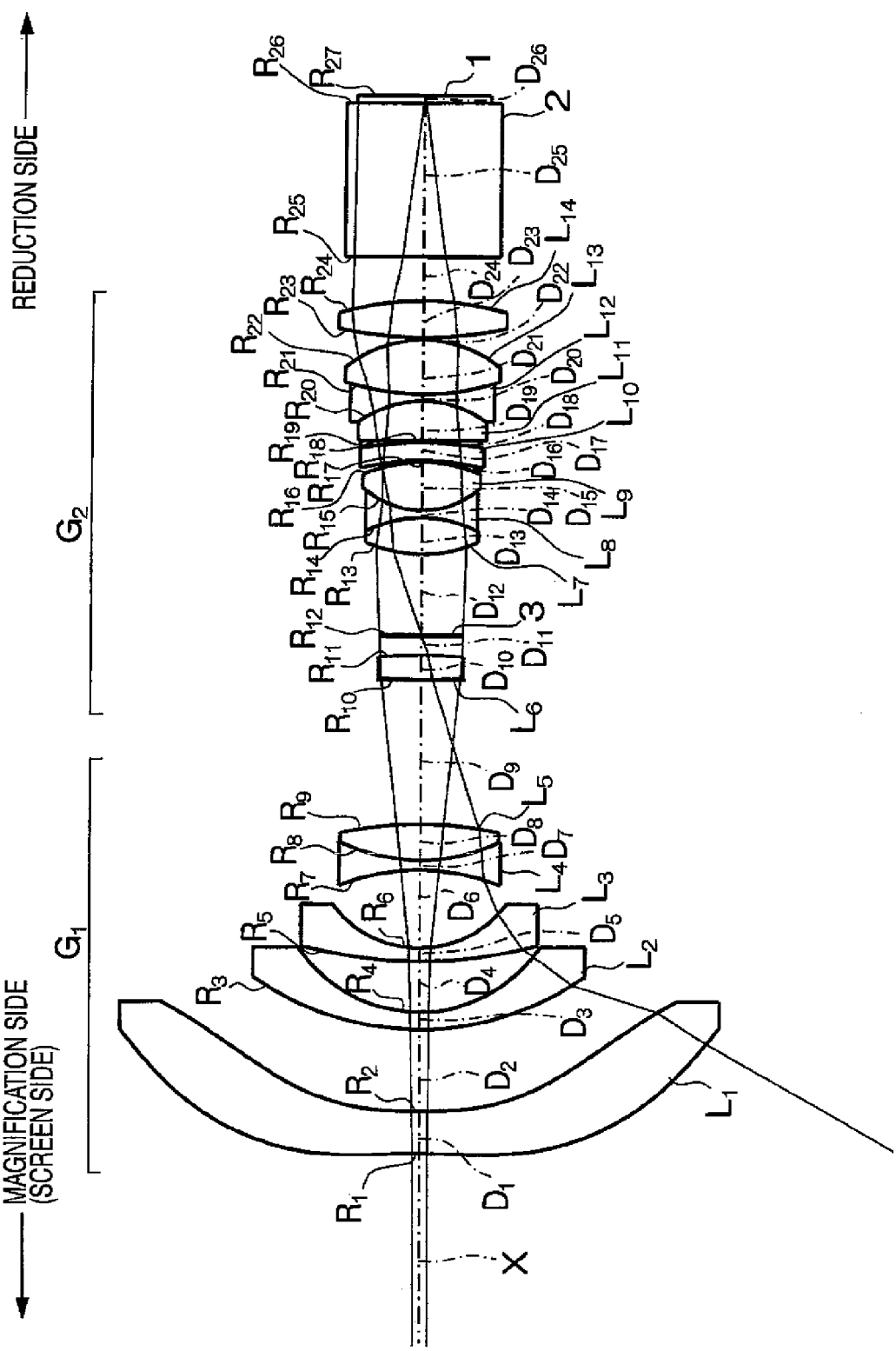
FIG. 6 is a diagram showing configuration of a projection lens according to an example 6 of the invention.
Figure 7:
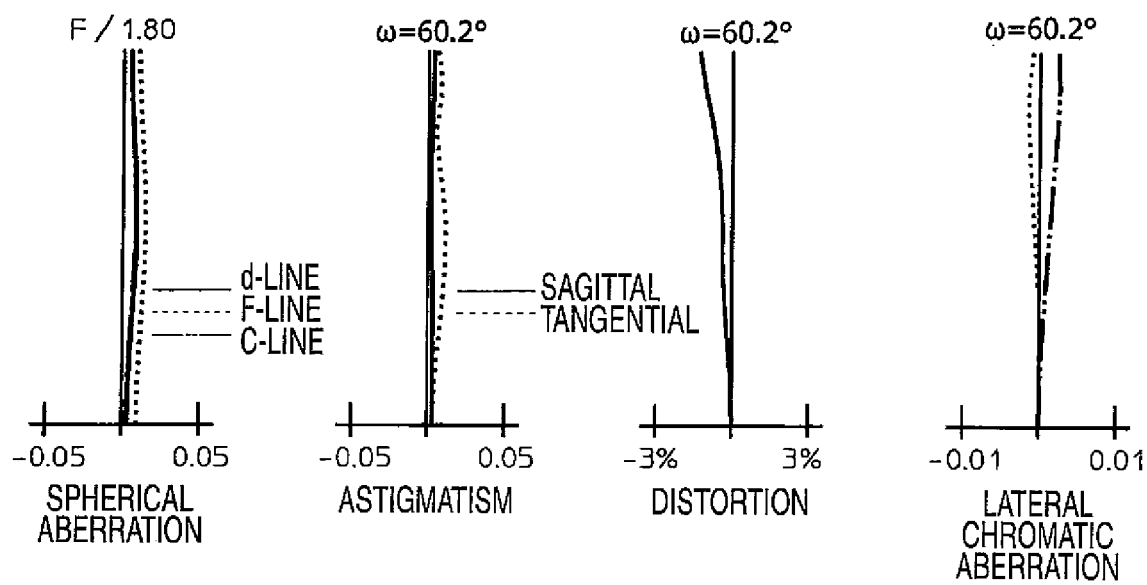
FIG. 7 is various aberration diagrams of the projection lens according to the embodiment 1.
Figure 8:
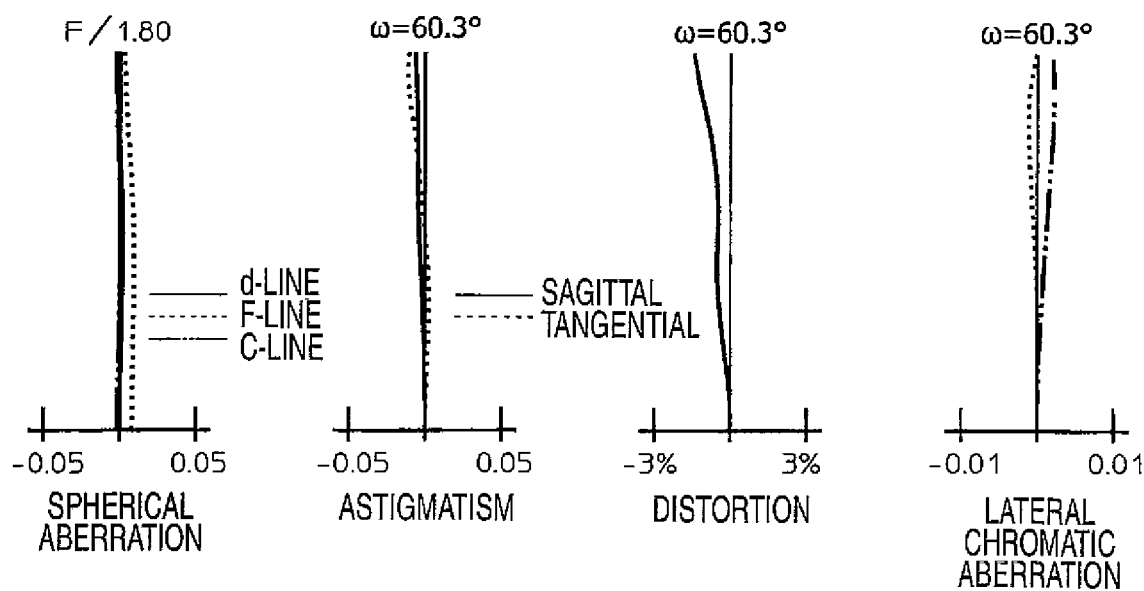
FIG. 8 is various aberration diagrams of the projection lens according to the embodiment 2.
Figure 9:
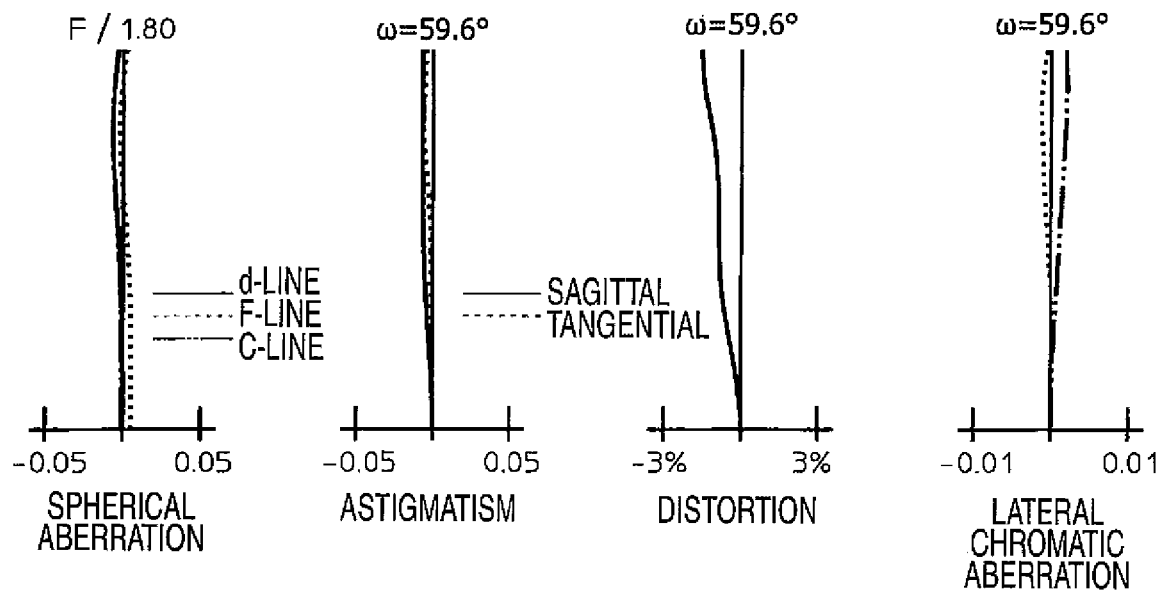
FIG. 9 is various aberration diagrams of the projection lens according to the embodiment 3.
Figure 10:
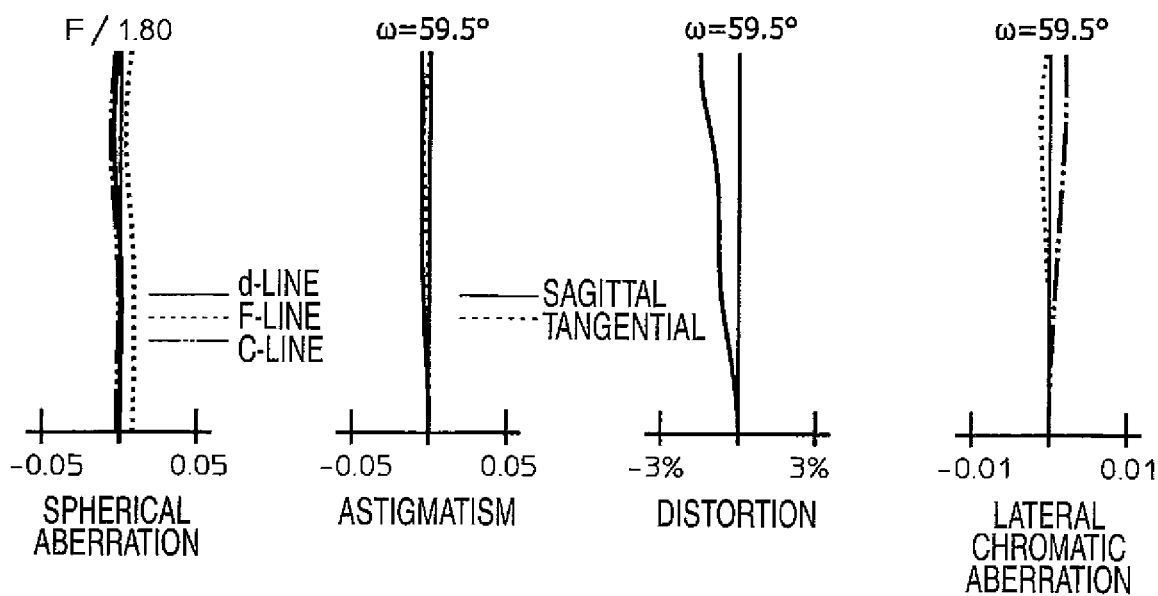
FIG. 10 is various aberration diagrams of the projection lens according to the embodiment 4.
Figure 11:
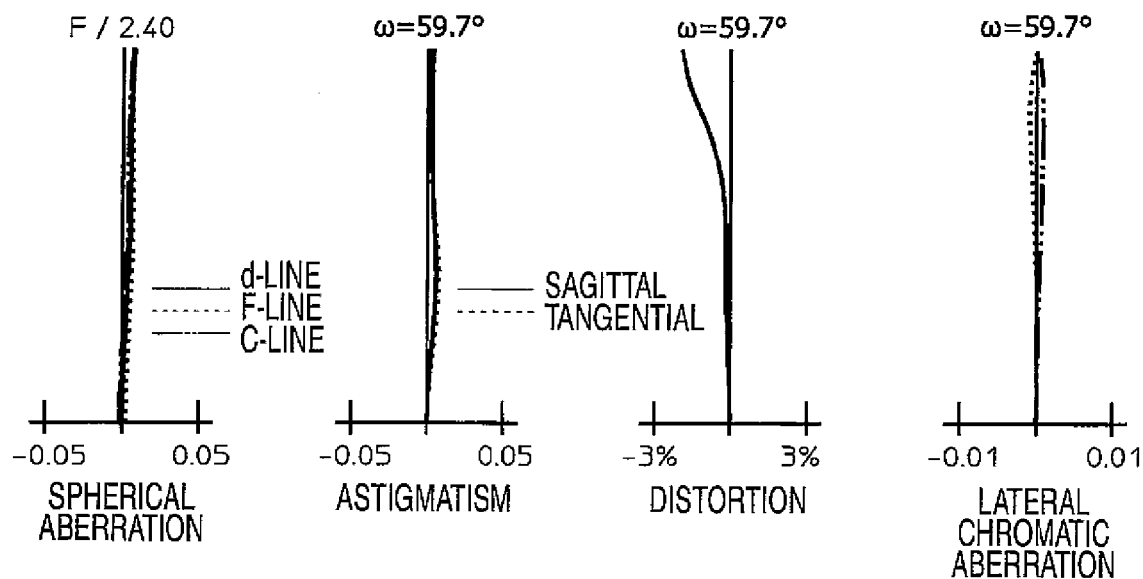
FIG. 11 is various aberration diagrams of the projection lens according to the embodiment 5.
Figure 12:
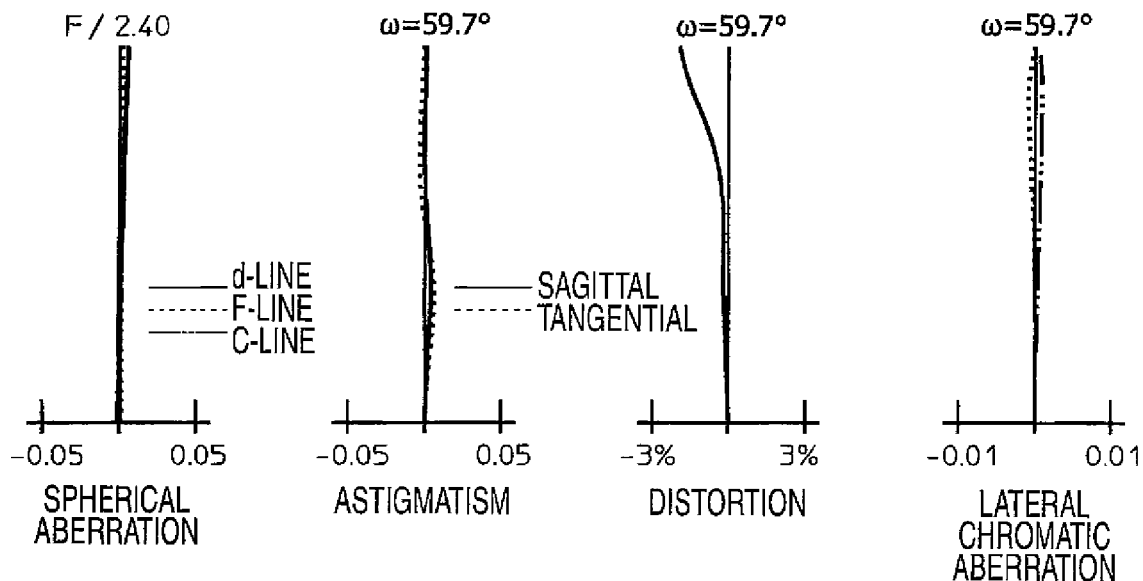
FIG. 12 is various aberration diagrams of the projection lens according to the embodiment 6.

The constitution of a projection lens according to an example 6 is as shown in FIG. 6. This projection lens has substantially similar constitution to the constitution of the projection lens in the example 5, and the explanation of the common portions is omitted. This projection lens is different from the projection lens in the example 5 in a point that the eleventh lens $L_{11}$ in the second lens group $G_2$ is a positive meniscus lens whose concave surface is directed to the magnification side.

Regarding the projection lens in the example 6, radii R of curvature of respective lens surfaces, on-axis surface spacing D between the respective lenses, and refractive indices $N_d$ and Abbe numbers $\upsilon_d$ of the respective lenses at the d-line are given on the upper portion of a table 6. Further, values of respective contacts K, and $A_3$ to $A_{12}$ corresponding to the respective aspheric surfaces are given on the middle portion of the table 6. Further, the projection lens in this example is configured so that: when focusing, according to the projection length, a cemented lens formed by two lenses which are a fourth lens $L_4$ and a fifth lens $L_5$ moves in the direction of the optical axis X. Further, a state where the predetermined lens variable spacing changes according to the projection length (length from a magnification-side conjugate position to a lens first surface) is given on the lower portion of the table 6.

The numerical data on the upper portion in the table 6 shows the case that the projection length (length from a magnification-side conjugate position to a lens first surface) is 77.885.

TABLE 6

| | R | D | $N_d$ | $\upsilon_d$ |
|---|---|---|---|---|
| 1* | −12.363 | 1.108 | 1.491 | 57.6 |
| 2* | 36.144 | 2.147 | | |
| 3 | 7.325 | 0.450 | 1.773 | 49.6 |
| 4 | 3.707 | 1.332 | | |
| 5 | 11.404 | 0.346 | 1.847 | 23.8 |
| 6 | 2.762 | 2.065 (Variable 1) | | |
| 7 | −5.529 | 0.260 | 1.623 | 58.2 |
| 8 | 4.736 | 0.940 | 1.673 | 32.1 |
| 9 | −9.418 | 3.808 (Variable 2) | | |
| 10 | 20.499 | 0.643 | 1.581 | 40.7 |
| 11 | −14.070 | 0.519 | | |
| 12 | ∞ | 2.140 (AD) | | |
| 13 | 3.573 | 0.963 | 1.728 | 28.5 |
| 14 | −3.165 | 0.173 | 1.804 | 46.6 |
| 15 | 2.230 | 1.270 | 1.497 | 81.6 |
| 16 | −3.938 | 0.052 | | |
| 17* | −5.652 | 0.467 | 1.510 | 56.2 |
| 18* | −7.174 | 0.052 | | |
| 19 | −130.959 | 1.031 | 1.487 | 70.2 |
| 20 | −2.799 | 0.173 | 1.847 | 23.8 |
| 21 | 6.308 | 1.425 | 1.497 | 81.6 |
| 22 | −3.147 | 0.052 | | |
| 23 | 9.885 | 0.973 | 1.497 | 81.6 |
| 24 | −7.742 | 1.149 | | |
| 25 | ∞ | 4.015 | 1.639 | 55.4 |
| 26 | ∞ | 0.190 | 1.487 | 70.2 |
| 27 | ∞ | | | |

Aspheric coefficients

| | K | $A_3$ | $A_4$ | $A_5$ | $A_6$ | $A_7$ |
|---|---|---|---|---|---|---|
| 1 | 0.800 | $1.635 \times 10^{-2}$ | $8.594 \times 10^{-4}$ | $-3.438 \times 10^{-4}$ | $-1.734 \times 10^{-5}$ | $1.141 \times 10^{-5}$ |
| 2 | −2.798 | $1.828 \times 10^{-2}$ | $3.710 \times 10^{-4}$ | $-3.349 \times 10^{-4}$ | $3.104 \times 10^{-6}$ | $-1.080 \times 10^{-6}$ |
| 17 | 1.000 | 0.000 | $1.180 \times 10^{-2}$ | $-1.247 \times 10^{-2}$ | $9.643 \times 10^{-4}$ | $8.025 \times 10^{-3}$ |
| 18 | 1.000 | 0.000 | $1.852 \times 10^{-2}$ | $-2.109 \times 10^{-2}$ | $1.679 \times 10^{-2}$ | $-8.709 \times 10^{-3}$ |

| | $A_8$ | $A_9$ | $A_{10}$ | $A_{11}$ | $A_{12}$ |
|---|---|---|---|---|---|
| 1 | $-7.518 \times 10^{-7}$ | $-5.515 \times 10^{-8}$ | $5.611 \times 10^{-9}$ | $4.969 \times 10^{-10}$ | $-5.530 \times 10^{-11}$ |
| 2 | $-3.261 \times 10^{-7}$ | $7.753 \times 10^{-8}$ | $5.911 \times 10^{-9}$ | $-3.111 \times 10^{-10}$ | $-6.660 \times 10^{-11}$ |
| 17 | $-4.912 \times 10^{-3}$ | $4.230 \times 10^{-4}$ | $2.589 \times 10^{-4}$ | | |
| 18 | $3.963 \times 10^{-3}$ | $-1.641 \times 10^{-3}$ | $2.897 \times 10^{-4}$ | | |

Lens movement in focusing

| | | | |
|---|---|---|---|
| Length from magnification-side conjugate position in above data to lens first surface | 51.923 | 77.885 | 121.154 |
| Variable spacing 1 | 1.889 | 2.065 | 2.193 |
| Variable spacing 2 | 3.984 | 3.808 | 3.680 |

*Aspheric surface
AD Aperture diaphragm

Values corresponding to the respective conditional expressions (1) to (6) in the example 6 are as shown in the table 7 described later, and their values satisfy all the conditional expressions (1) to (6) (satisfy also the conditional expression (2') and (4')).

TABLE 7

|  | Example 1 | Example 2 | Example 3 | Example 4 | Example 5 | Example 6 |
|---|---|---|---|---|---|---|
| Expression (1) | 4.18 | 4.18 | 3.96 | 3.94 | 3.72 | 3.72 |
| Expression (2) and (2') | 0.55 | 0.57 | 0.55 | 0.56 | 0.54 | 0.55 |
| Expression (3) | −2.86 | −1.75 | −1.92 | −2.51 | −1.95 | −1.92 |
| Expression (4) and (4') | 4.95 | 5.20 | 5.39 | 5.13 | 5.76 | 5.83 |
| Expression (5) | 120.4 | 120.6 | 119.2 | 119.0 | 119.4 | 119.4 |
| Expression (6) | 0.08357 | 0.08357 | 0.07355 | 0.07355 | 0.01957 | 0.04971 |

Further, FIGS. 7 to 12 are aberration diagrams showing various aberrations (spherical aberration, astigmatism, distortion, and lateral chromatic aberration) of the projection lenses according to the examples 1 to 6. In these aberration diagrams, ω denotes a half angle of view, aberration curves of the d-line, the F-line and the C-line are shown in the aberration diagrams of spherical aberration, and aberration curves of the F-line and the C-line with respect to the d-line are shown in the aberration diagrams of lateral chromatic aberration. As apparent from FIG. 7 to 12, in the projection lens in the examples 1 to 6, the respective aberrations including the distortion and the lateral chromatic aberration are corrected satisfactorily, the angle of view 2ω is 119.0 to 120.6 degrees, and the F-number is 1.80 to 2.40. Namely, these projection lenses are fast lenses having the super wide angle of view.

The projection lens of the invention is not limited to the projection lens in the above examples, but various modifications of the mode are possible. For example, the radius R of curvature of each lens and the lens spacing (or lens thickness) D can be appropriately changed. Further, it is not excluded that the invention is applied to a projection lens mounted on the rear type projection type display device.

Further, the projection type display device of the invention is not also limited to that having the above configuration, but various device configurations having the projection lens of the invention are possible. As the light valve, in addition to the transmission type liquid crystal display element, for example, a reflection type liquid crystal display element or a micromirror element in which many micromirrors capable of changing their inclination are formed on a substantially flat surface (for example, a DMD (Digital Micromirror Device by Texas Instruments Inc.)) can be used. Further, also regarding the illumination optical system, the appropriate configuration can be adopted according to the kind of light valve.

What is claimed is:

1. A projection lens comprising, in order from a magnification side:

a first lens group having negative refractive power; and a second lens group having positive refractive power, wherein an aspheric lens is arranged on the most magnification side of the first lens group, the projection lens is substantially telecentric on a reduction side, and the following conditional expressions (1) and (2) are satisfied:

$$3 < Bf/f \quad (1)$$

$$0.4 < H/L \quad (2)$$

where f denotes a focal length of the projection lens, Bf denotes an air-converted back focal length, H denotes a height of a principal ray at the maximum angle of view on a plane (i) which is orthogonal to an optical axis and (ii) which passes through a vertex of a lens surface on the most magnification side on the optical axis, and L denotes a length from the vertex of the lens surface on the most magnification side on the optical axis to a vertex of a lens surface on the most reduction side on the optical axis.

2. The projection lens according to claim 1, wherein the following conditional expressions (2') and (3) are satisfied:

$$0.5 < H/L \quad (2')$$

$$110° < 2\omega \quad (3)$$

where ω denotes a half angle of view.

3. The projection lens according to claim 1, wherein the second lens group includes:

at least two cemented surfaces; and at least two positive lenses each of which is formed of material having an Abbe number of 75 or more at the d-line.

4. The projection lens according to claim 1, wherein the second lens group includes at least one aspheric surface.

5. The projection lens according to claim 1, wherein a cemented lens formed by cementing a negative lens and a positive lens is arranged on the most reduction side of the first lens group, and when focusing is performed, at least the cemented lens is moved in the direction of the optical axis.

6. The projection lens according to claim 1, wherein a cemented lens formed by cementing a negative lens and a positive lens is arranged on the most reduction side of the first lens group, and when focusing is performed, the cemented lens and all or a part of lenses other than the cemented lens in the first lens group are moved in the direction of the optical axis independently of each other.

7. The projection lens according to claim 1, wherein the following conditional expressions (4) and (5) are satisfied:

$$-5 < f_1/f < -1 \quad (4)$$

$$f_2/f < 10 \quad (5)$$

where $f_1$ denotes a focal length of the first lens group, and $f_2$ denotes a focal length of the second lens group.

8. The projection lens according to claim 1, wherein the first lens group includes, in order from the magnification side:

an aspheric lens formed of plastic;

at least one negative meniscus lens having a convex surface facing to the magnification side;

a negative lens having a concave surface facing to the reduction side; and a cemented lens formed by a positive lens and a negative lens.

9. The projection lens according to claim 6,
wherein the cemented lens in the first lens group satisfies the following conditional expression (6):

$$|N_p - N_n| < 0.1 \qquad (6)$$

where $N_p$ denotes a refractive index of the positive lens of the cemented lens, and $N_n$ denotes a refractive index of the negative lens of the cemented lens.

10. A projection type display device comprising:

a light source, a light valve, an illumination optical portion that guides luminous flux from the light source to the light valve; and the projection lens according to claim 1, wherein the luminous flux from the light source is optically modulated by the light valve and projected onto a screen through the projection lens.

\* \* \* \* \*